(12) United States Patent
Okada

(10) Patent No.: US 7,463,978 B2
(45) Date of Patent: Dec. 9, 2008

(54) NAVIGATION APPARATUS AND MAP-INDICATION CONTROL PROGRAM

(75) Inventor: Akiyoshi Okada, Maebashi (JP)

(73) Assignee: Victor Company of Japan, Ltd., Yokohama (JP)

( * ) Notice: Subject to any disclaimer, the term of this patent is extended or adjusted under 35 U.S.C. 154(b) by 483 days.

(21) Appl. No.: 11/123,127

(22) Filed: May 6, 2005

(65) Prior Publication Data
US 2005/0278115 A1    Dec. 15, 2005

(30) Foreign Application Priority Data
Jun. 10, 2004    (JP) ............................. 2004-172390

(51) Int. Cl.
G01C 21/32    (2006.01)
G08G 1/0969   (2006.01)

(52) U.S. Cl. .................. 701/212; 701/206; 701/209; 701/211; 340/995.15; 342/357.13

(58) Field of Classification Search .............. 342/212; 340/995.15
See application file for complete search history.

(56) References Cited

U.S. PATENT DOCUMENTS

| | | | | |
|---|---|---|---|---|
| 4,876,651 A | * | 10/1989 | Dawson et al. ............... | 701/200 |
| 4,914,605 A | * | 4/1990 | Loughmiller et al. ......... | 345/649 |
| 5,113,185 A | * | 5/1992 | Ichikawa ................ | 340/995.27 |
| 5,396,430 A | * | 3/1995 | Arakawa et al. ............ | 701/200 |
| 5,398,033 A | * | 3/1995 | Michie ..................... | 342/26 B |
| 5,444,618 A | * | 8/1995 | Seki et al. .................... | 702/5 |
| 5,568,390 A | * | 10/1996 | Hirota et al. ................ | 701/201 |
| 5,612,881 A | * | 3/1997 | Moroto et al. .............. | 701/209 |
| 5,638,280 A | * | 6/1997 | Nishimura et al. .......... | 701/209 |
| 5,787,383 A | * | 7/1998 | Moroto et al. .............. | 701/210 |
| 5,884,217 A | * | 3/1999 | Koyanagi ................... | 701/208 |
| 5,944,768 A | * | 8/1999 | Ito et al. ..................... | 701/200 |

(Continued)

FOREIGN PATENT DOCUMENTS

JP    7-332993    12/1995

(Continued)

OTHER PUBLICATIONS

Machine Tranlsation of JP 07332993. Hirota et al. Dec. 1995.*

*Primary Examiner*—Thomas G. Black
*Assistant Examiner*—Shelley Chen
(74) *Attorney, Agent, or Firm*—Louis Woo

(57) ABSTRACT

A display screen indicates a map on a first scale. After a vehicle passes a guide point, determinations are made as to whether or not an on-map position of a next guide point is outside a predetermined large-area indication deciding frame in the display screen, and as to whether or not the on-map position of the next guide point is inside a predetermined detailed indication deciding frame in the display screen. A second scale in a range where the current position of the vehicle and the on-map position of the next guide point are in the display screen is computed in response to results of the determinations. The display screen successively indicates the map on the first scale, maps on different intermediate scales between the first and second scales, and a map on the second scale in either a reducing order or a magnifying order at prescribed time intervals.

5 Claims, 8 Drawing Sheets

U.S. PATENT DOCUMENTS

| | | | | |
|---|---|---|---|---|
| 6,061,003 | A * | 5/2000 | Harada | 340/995.15 |
| 6,067,502 | A * | 5/2000 | Hayashida et al. | 701/209 |
| 6,216,669 | B1 * | 4/2001 | Aoki | 123/406.65 |
| 6,304,212 | B1 * | 10/2001 | Aoki et al. | 342/357.13 |
| 6,311,126 | B1 * | 10/2001 | Katayama et al. | 701/208 |
| 6,333,702 | B1 * | 12/2001 | Hiyokawa et al. | 340/995.21 |
| 6,356,835 | B2 * | 3/2002 | Hayashi et al. | 701/208 |
| 6,895,331 | B2 * | 5/2005 | Yoshida | 701/212 |
| 6,912,462 | B2 * | 6/2005 | Ogaki | 701/208 |
| 2001/0039474 | A1 * | 11/2001 | Hayashi et al. | 701/208 |
| 2003/0018427 | A1 * | 1/2003 | Yokota et al. | 701/208 |
| 2004/0243307 | A1 * | 12/2004 | Geelen | 701/213 |
| 2005/0046615 | A1 * | 3/2005 | Han | 342/357.06 |
| 2005/0049779 | A1 * | 3/2005 | Yasuda et al. | 701/200 |
| 2005/0096812 | A1 * | 5/2005 | Nezu et al. | 701/36 |
| 2005/0099323 | A1 * | 5/2005 | Hirose | 340/995.13 |
| 2005/0278115 | A1 * | 12/2005 | Okada | 701/212 |
| 2006/0025920 | A1 * | 2/2006 | Nezu et al. | 701/200 |
| 2006/0220923 | A1 * | 10/2006 | Tanizaki et al. | 340/995.1 |
| 2007/0176796 | A1 * | 8/2007 | Bliss et al. | 340/995.14 |

FOREIGN PATENT DOCUMENTS

| | | | |
|---|---|---|---|
| JP | 07332993 | A * | 12/1995 |
| JP | P2001-074481 | A | 3/2001 |
| JP | P2002-148058 | A | 5/2002 |
| JP | 2006023712 | A * | 1/2006 |

* cited by examiner

NAVIGATION APPARATUS AND MAP-INDICATION CONTROL PROGRAM

BACKGROUND OF THE INVENTION

1. Field of the Invention

This invention relates to an on-vehicle navigation apparatus indicating a map on a changeable scale. In addition, this invention relates to a computer program for controlling the indication of a map to change the scale of the indicated map. Furthermore, this invention relates to an navigation method to provide the indication of a map on a changeable scale.

2. Description of the Related Art

A general on-vehicle navigation apparatus includes a display device of a liquid crystal type or a CRT type which indicates a two-dimensional or three-dimensional map showing the current position of the vehicle, a desired destination, and a selected or recommended route to the destination. A user can input information about the destination into the navigation apparatus via voices uttered or via a digitizer. The navigation apparatus may give audible guidance on the route.

A first advanced on-vehicle navigation apparatus indicates a small-scale map of a large area to simultaneously show the current vehicle's position, a desired destination, and a recommended route to the destination when the current vehicle's position is far from the destination. The first advanced apparatus indicates a large-scale map of a small area when the current vehicle's position is near the destination.

A second advanced on-vehicle navigation apparatus changes an indicated-map scale depending on whether or not the current vehicle's position is near an intersection at which the vehicle should turn. Specifically, the second advanced apparatus indicates a detailed large-scale map of a small area to clearly show a required portion of a recommended route to a desired destination when the current vehicle's position is near an intersection at which the vehicle should turn.

Generally, important points on which guidance should be given in vehicle navigation are referred to as maneuver points. The maneuver points include a crossing or an intersection at which the vehicle should turn, a landmark, and a dangerous point for which a warning should be given. The maneuver points are also called the guide points.

There are prior-art technologies for changing the scale of a map indicated in a navigation apparatus.

Japanese patent application publication number 07-332993/1995 discloses an on-vehicle navigation apparatus which indicates a map showing the current vehicle's position. The apparatus of Japanese application 07-332993 is designed to automatically change the display scale of the indicated map in response to movement of the current vehicle's position to provide proper navigation information to the vehicle's driver.

In the apparatus of Japanese application 07-332993, a map database is searched for a recommended route to a desired destination. Detection is made as to important points such as a right/left-turn crossing and a complexly-shaped crossing in the recommended route. When the current vehicle's position approaches an important point, a desired map scale is set on which both the current vehicle's position and the important point are simultaneously in a same display screen. The map is drawn and indicated on the desired scale, and both the current vehicle's position and the important point are simultaneously shown in the indicated map. Thus, when the current vehicle's position approaches an important point, a detailed large-scale map of a small area is indicated. On the other hand, when the current vehicle's position is far from important points, a small-scale map of a large area is indicated. Accordingly, in the case where the vehicle continuously moves along a succession of important points, a small-scale map of a large area remains unindicated for a long time. In this case, it tends to be difficult for the vehicle's driver to accurately grasp the relation among the current vehicle's position, the recommended route, and the destination.

Japanese patent application publication number 2001-74481 discloses an on-vehicle navigation apparatus which indicates a map on such a scale that both a starting point and a desired destination are simultaneously shown in the indicated map. When the user traces a desired rough route to the destination on the indicated map by use of a user's finger or a pen in contact with a display surface, information about the desired rough route is inputted into the apparatus. A recommended detailed route close to the desired rough route is searched for. The recommended detailed route is shown in the indicated map. In the case where the starting point is far from the destination, a detailed large-scale map of a small area can not be indicated even when the vehicle approaches an important point such as a crossing.

Japanese patent application publication number 2002-148058 discloses an on-vehicle navigation apparatus designed so that the scale of an indicated map and the number of important points shown in the indicated map are in a predetermined relation. The important points are, for example, intersections, interchanges, junctions, service areas, and parking areas.

In the apparatus of Japanese application 2002-148058, a display surface can be divided into first and second windows. The first window is occupied by an indicated map inclusive of important points while the second window is occupied by a list of the names of the important points. The number of important points to be shown can be controllably designated by the user. The scale of the indicated map is decided in accordance with the designated number of important points to be shown. Thus, the scale of the indicated map is varied as the designated number of important points to be shown is changed.

In the apparatus of Japanese application 2002-148058, the scale of the indicated map is controlled so that the indicated map will be the most detailed in a range where it can simultaneously show both the current vehicle's position and a desired destination. Accordingly, a more detailed map is indicated as the vehicle moves toward the destination. In the case where the current vehicle's position is far from the destination, a detailed large-scale map of a small area can not be indicated even when the vehicle approaches an important point.

SUMMARY OF THE INVENTION

It is a first object of this invention to provide a navigation apparatus which enables the user to easily grasp a recommended route to a desired destination, and which has good animation effects and high visual performances.

It is a second object of this invention to provide a computer program for controlling the indication of a map in a navigation system which enables the user to easily grasp a recommended route to a desired destination, and which produces good animation effects and high visual performances.

It is a third object of this invention to provide a navigation method which enables the user to easily grasp a recommended route to a desired destination, and which produces good animation effects and high visual performances.

A first aspect of this invention provides a navigation apparatus for a vehicle. The navigation apparatus comprises a position detector for detecting a current position of the vehicle; first means for deciding a recommended route from the current position of the vehicle to a desired destination; a display device having a screen; second means for controlling the display device to indicate a map on a first scale, at least a portion of the recommended route, and the current position of the vehicle on the screen; third means for, after the vehicle passes a first guide point in the recommended route, determining whether or not an on-map position of a second guide point in the recommended route which is next to the first guide point is outside a predetermined large-area indication deciding frame in the screen, and determining whether or not the on-map position of the second guide point is inside a predetermined detailed indication deciding frame in the screen; fourth means for computing a second scale in a range where the current position of the vehicle and the on-map position of the second guide point are in the screen in response to results of the determining by the third means; fifth means for setting a prescribed number of different intermediate scales between the first scale and the second scale; and sixth means for controlling the display device to successively indicate the map on the first scale, maps on the different intermediate scales, and a map on the second scale on the screen in either a reducing order or a magnifying order at prescribed time intervals.

A second aspect of this invention provides a method of vehicle navigation. The method comprises the steps of detecting a current position of a vehicle; deciding a recommended route from the current position of the vehicle to a desired destination; indicating a map on a first scale, at least a portion of the recommended route, and the current position of the vehicle on a screen; after the vehicle passes a first guide point in the recommended route, determining whether or not an on-map position of a second guide point in the recommended route which is next to the first guide point is outside a predetermined large-area indication deciding frame in the screen, and determining whether or not the on-map position of the second guide point is inside a predetermined detailed indication deciding frame in the screen; computing a second scale in a range where the current position of the vehicle and the on-map position of the second guide point are in the screen in response to results of the determining; setting a prescribed number of different intermediate scales between the first scale and the second scale; and successively indicating the map on the first scale, maps on the different intermediate scales, and a map on the second scale on the screen in either a reducing order or a magnifying order at prescribed time intervals.

A third aspect of this invention provides a map-indication control program for use in a vehicle navigation apparatus including a position detector for detecting a current position of a vehicle, means for deciding a recommended route from the current position of the vehicle to a desired destination, a display device having a screen, and means for controlling the display device to indicate a map on a first scale, at least a portion of the recommended route, and the current position of the vehicle on the screen. The map-indication control program enables a computer in the vehicle navigation apparatus to operate as first means for, after the vehicle passes a first guide point in the recommended route, determining whether or not an on-map position of a second guide point in the recommended route which is next to the first guide point is outside a predetermined large-area indication deciding frame in the screen, and determining whether or not the on-map position of the second guide point is inside a predetermined detailed indication deciding frame in the screen; second means for computing a second scale in a range where the current position of the vehicle and the on-map position of the second guide point are in the screen in response to results of the determining by the first means; third means for setting a prescribed number of different intermediate scales between the first scale and the second scale; and fourth means for controlling the display device to successively indicate the map on the first scale, maps on the different intermediate scales, and a map on the second scale on the screen in either a reducing order or a magnifying order at prescribed time intervals.

This invention provides advantages as follows. During navigation concerning a recommended route from the current position of the vehicle to a desired destination, a detailed small-area map inclusive of the current vehicle's position and a next guide point (for example, a next crossing at which the vehicle should turn) or a large-area map is indicated. Accordingly, it is possible for the user to easily and accurately grasp the recommended route.

During indicated map replacement involving map scale change, a map on a first scale, maps on different intermediate scales between the first scale and a second scale, and a map on the second scale are successively indicated on a zooming basis. Therefore, the indicated map change has good animation effects and high visual performances.

DETAILED DESCRIPTION OF THE INVENTION

First Embodiment

Figure 1:
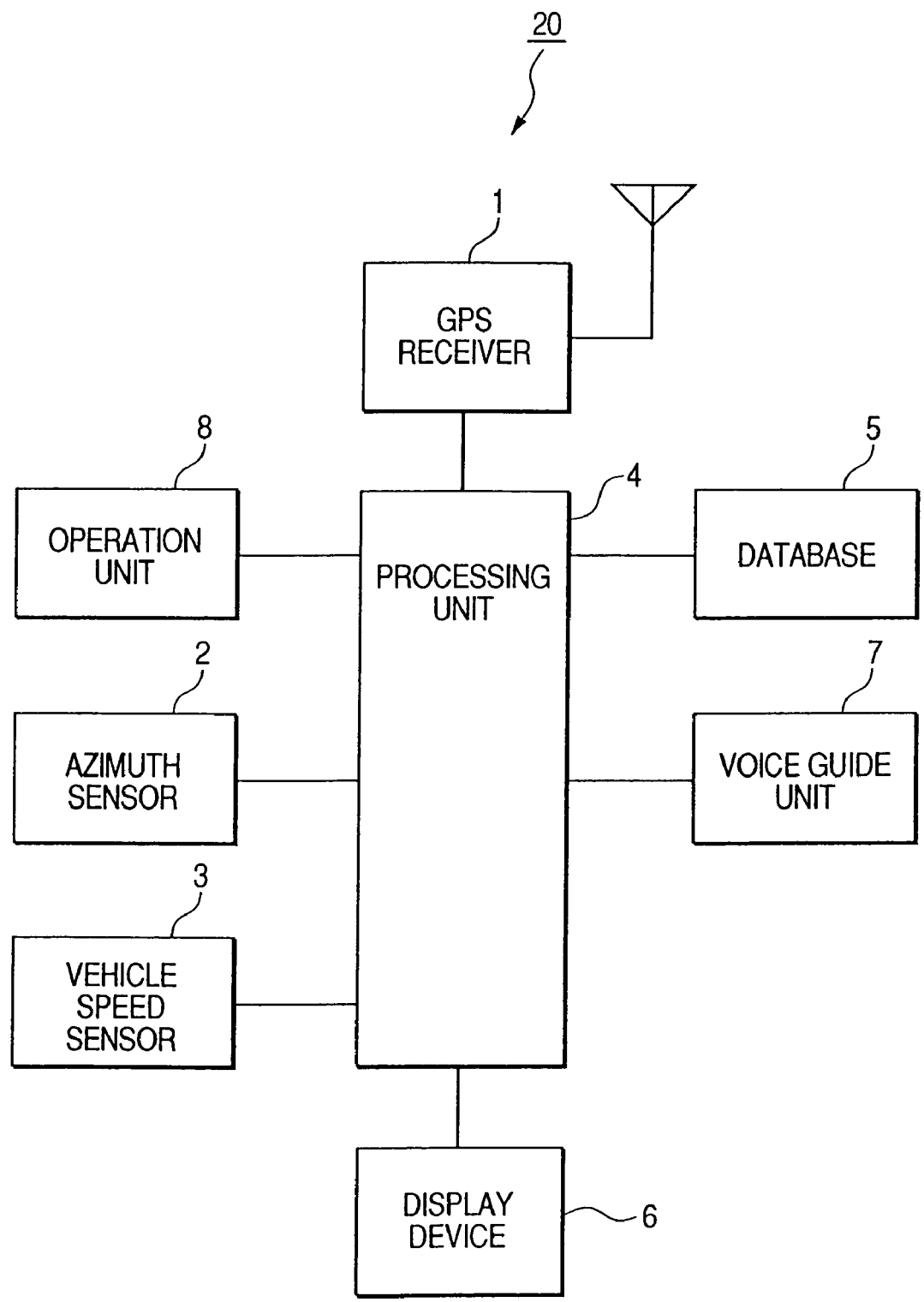
FIG. 1 is a block diagram of a navigation apparatus according to a first embodiment of this invention.

FIG. 1 shows a navigation apparatus 20 according to a first embodiment of this invention. The navigation apparatus 20 is mounted on a vehicle.

As shown in FIG. 1, the navigation apparatus 20 includes a GPS (Global Positioning System) receiver 1, an azimuth sensor 2, a vehicle speed sensor 3, a processing unit 4, a database 5, a display device 6, a voice guide unit 7, and an operation unit 8. The GPS receiver 1, the azimuth sensor 2, the vehicle speed sensor 3, the database 5, the display device 6, the voice guide unit 7, and the operation unit 8 are connected with the processing unit 4.

The GPS receiver 1 is provided with an antenna for catching radio signals from a plurality of artificial satellites. The radio signals are fed from the antenna to the body of the GPS receiver 1. The GPS receiver 1 converts the radio signals into GPS data, and calculates the current position (the current latitude and longitude) of the vehicle on the basis of the GPS data. The GPS receiver 1 generates a signal representing the calculated current position of the vehicle. The GPS receiver 1 outputs the vehicle position signal to the processing unit 4.

The azimuth sensor 2 responds to the terrestrial magnetism, and detects the current direction of travel of the vehicle. The azimuth sensor 2 generates a signal representing the detected current direction of travel of the vehicle. The azimuth sensor 2 outputs the vehicle travel direction signal to the processing unit 4.

The vehicle speed sensor 3 detects the current speed of the vehicle. The vehicle speed sensor 3 generates a signal representing the detected current speed of the vehicle. Integrating the detected current vehicle speed provides information about the distance traveled by the vehicle. The vehicle speed sensor 3 outputs the vehicle speed signal to the processing unit 4.

It should be noted that another sensor such as a steering sensor may be provided on the vehicle to get information about another vehicle parameter.

The user (the vehicle's driver) can input information of various types such as information about a desired destination and information about a starting point into the navigation apparatus 20 by actuating the operation unit 8 with user's finger. The operation unit 8 subjects the inputted information to digitizing to generate a digital representation of the inputted information which can be directly handled by the processing unit 4. The digital representation of the inputted information is outputted from the operation unit 8 to the processing unit 4.

The database 5 is provided in a storage unit having a combination of a recording medium and a recording-medium drive. The recording medium is, for example, a CD-ROM, a DVD, or a hard disk. The database 5 holds map data (original map data) representing an original map or a basic map on a predetermined scale.

It should be noted that the map data in the database 5 may represent a set of maps on various predetermined scales. In this case, the set of maps includes a small-scale map of a large area, intermediate-scale maps of intermediate areas, and a detailed large-scale map of a small area. The details of a place at and around a crossing can be shown in a detailed large-scale map of a small area.

The processing unit 4 includes a microcomputer having a combination of an input/output port, a processing section, a ROM, and a RAM. The processing unit 4 operates in accordance with a control program (a computer program) stored in the ROM. The control program is designed to enable the processing unit 4 to carry out operation steps mentioned hereafter.

The processing unit 4 reads out the map data from the database 5, and feeds the map data to the display device 6. The processing unit 4 controls the display device 6 to indicate a map represented by the map data. The display device 6 has a screen on which the indicated map appears. The display device 6 includes, for example, a liquid crystal display or a CRT. The processing unit 4 derives information about the current position of the vehicle from the output signals of the GPS receiver 1, the azimuth sensor 2, and the vehicle speed sensor 3. The processing unit 4 feeds the information about the current vehicle's position to the display device 6 and controls the display device 6 so that the current vehicle's position will be shown in the indicated map.

The processing unit 4 can receive, from the operation unit 8, information about a desired destination and information about a starting point. The starting point may be the current vehicle's position. The processing unit 4 searches the map data in the database 5 for a recommended route from the starting point to the destination in response to the information about the starting point and the information about the destination. The processing unit 4 feeds a signal representative of the recommended route to the display device 6 and controls the display device 6 so that at least a portion of the recommended route will be shown in the indicated map.

Important points on which visual and voice guidance should be given in vehicle navigation are referred to as guide points (maneuver points). The guide points include an intersection or a crossing at which the vehicle should turn, a landmark, and a dangerous point for which a warning should be given.

The voice guide unit 7 includes a voice synthesizing circuit for generating an audio signal representative of voice guidance, and a loudspeaker for converting the audio signal into the voice guidance.

The processing unit 4 refers to the map data in the database 5, and thereby detects a guide point in the recommended route to which the vehicle is close. The processing unit 4 controls the voice guide unit 7 in response to the detected guide point to give voice guidance thereon.

The processing unit 4 can control the scale of a map indicated by the display device 6. The processing unit 4 decides whether or not the vehicle has just passed a guide point in the recommended route. The processing unit 4 detects a guide point in the recommended route which is next to one the vehicle has just passed. The processing unit 4 automatically changes the scale of the indicated map so that immediately after the vehicle passes a guide point in the recommended route, a next guide point will be shown in the indicated map. In a particular case, the next guide point is the destination. The processing unit 4 implements the map scale change on a zooming basis with visual animation effects.

Figure 2:
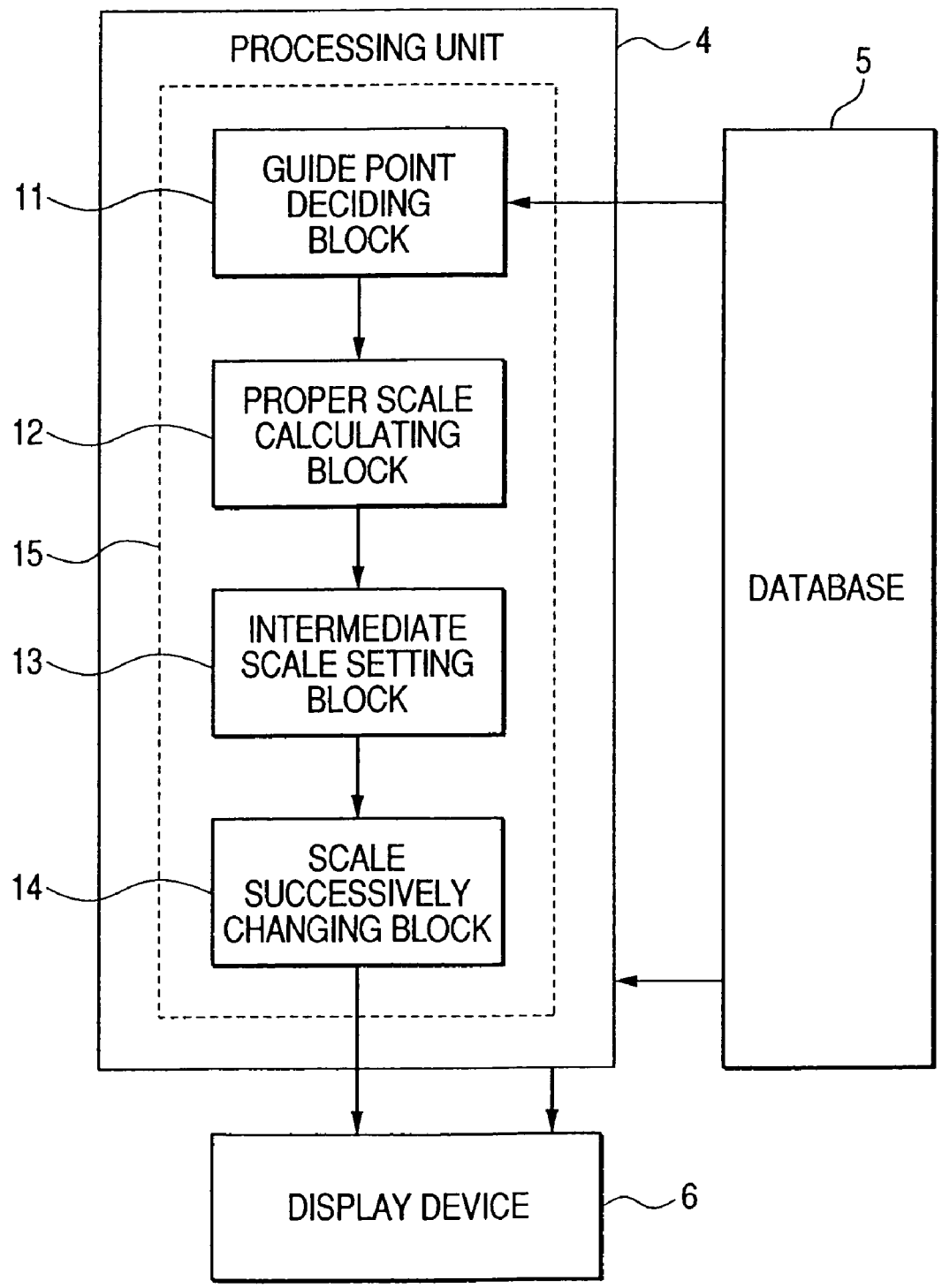
FIG. 2 is an operation flow diagram of a processing unit in FIG. 1.

FIG. 2 shows the flow of operation of the processing unit 4 rather than the hardware structure thereof. With reference to FIG. 2, there is an automatic scale changing block 15 in the processing unit 4. The automatic scale changing block 15 includes a guide point deciding block 11, a proper scale calculating block 12, an intermediate scale setting block 13, and a scale successively-changing block 14.

Figure 3:
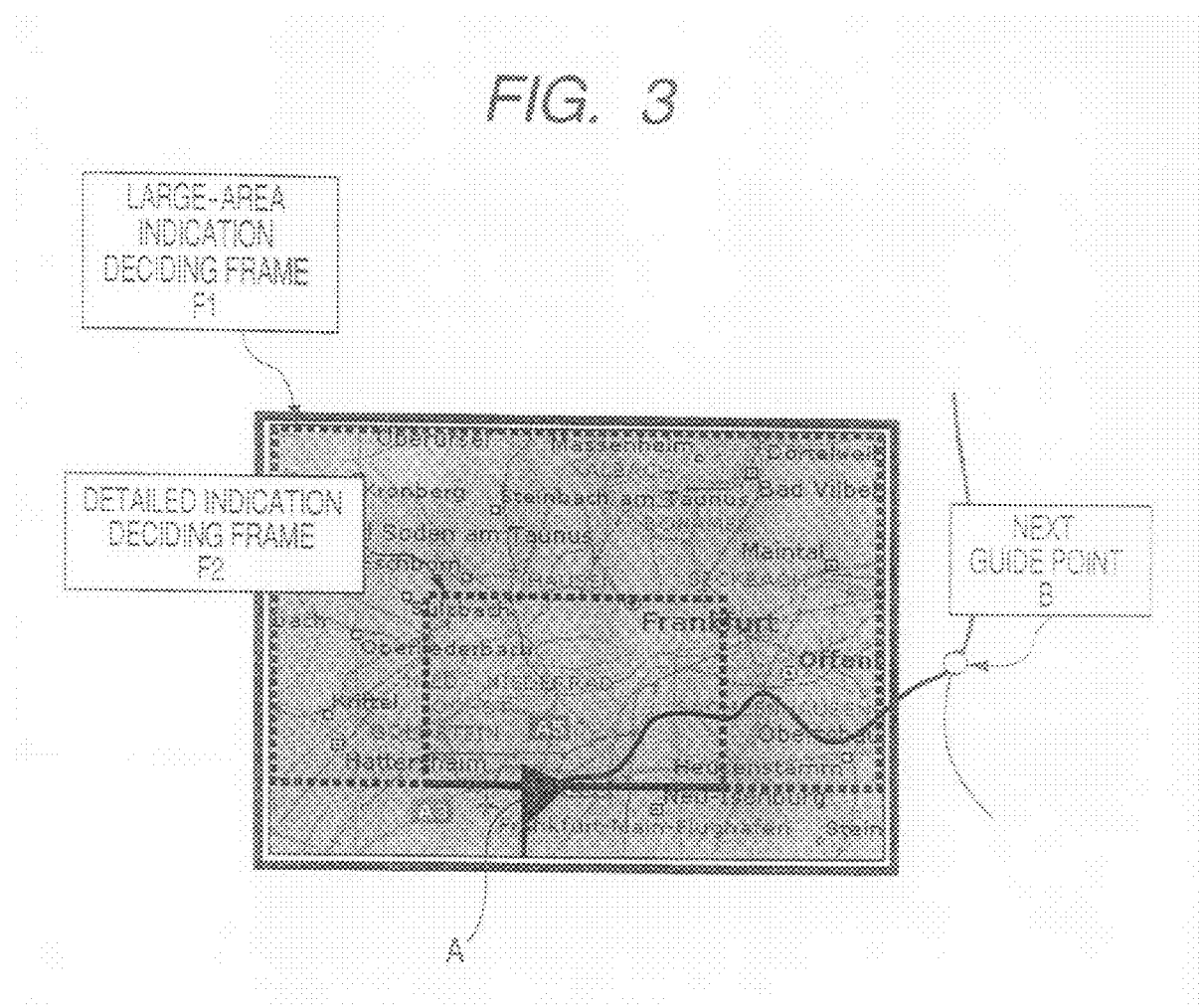
FIG. 3 is a diagram of an example of a map indicated by a display device in FIG. 1.

The guide point deciding block 11 predetermines a large-area indication deciding frame F1 and a detailed indication deciding frame F2 virtually extending in the screen of the display device 6. As shown in FIG. 3, the large-area indication deciding frame F1 and the detailed indication deciding frame F2 are rectangular. In FIG. 3, the large-area indication deciding frame F1 and the detailed indication deciding frame F2 are denoted by the white broken lines. On the other hand, the recommended route is denoted by the black thick line, and the current vehicle's position is denoted by the letter "A". The detailed indication deciding frame F2 is basically located in the large-area indication deciding frame F1. Thus, the detailed indication deciding frame F2 is smaller than the large-area indication deciding frame F1. In FIG. 3, the lower side of the detailed indication deciding frame F2 overlaps a portion of the lower side of the large-area indication deciding frame F1. In this case, it is preferable that the current vehicle's position "A" is located at the center of the lower sides of the large-area indication deciding frame F1 and the detailed indication deciding frame F2.

The guide point deciding block 11 detects guide points in the recommended route. The guide point deciding block 11 detects when the vehicle has just passed each detected guide point. Immediately after the vehicle passes one guide point, the guide point deciding block 11 determines whether the on-map position of a next guide point "B" in the recommended route is inside or outside the large-area indication deciding frame F1, and also determines whether the on-map position of the next guide point "B" is inside or outside the detailed indication deciding frame F2.

The proper scale calculating block 12 computes a proper scale 1/Nb of the indicated map when the results of the determinations by the guide point deciding block 11 represent that the on-map position of the next guide point "B" is outside the large-area indication deciding frame F1 or inside the detailed indication deciding frame F2. The proper scale 1/Nb is equal to or corresponds to the greatest one in a range where both the current vehicle's position "A" and the next guide point "B" are simultaneously in the screen of the display device 6. In other words, the proper scale 1/Nb is such that the indicated map is the most detailed in a range where it can simultaneously show both the current vehicle's position "A" and the next guide point "B".

The intermediate scale setting block 13 detects the scale 1/Na of the map currently indicated by the display device 6. The intermediate scale setting block 13 gets information about the proper scale 1/Nb computed by the proper scale calculating block 12. The intermediate scale setting block 13 sets a prescribed number of different intermediate scales 1/N1, 1/N2, between the current scale 1/Na and the computed proper scale 1/Nb.

The scale successively-changing block 14 reads out the map data from the database 5. The scale successively-changing block 14 processes the read-out map data into second map data in response to the intermediate scales 1/N1, 1/N2, . . . and the proper scale 1/Nb. The processing of the read-out map data into the second map data corresponds to map reduction or map magnification. The second map data represents maps on the intermediate scales 1/N1, 1/N2, . . . and the proper scale 1/Nb. The scale successively-changing block 14 uses the second map data, and thereby successively draws the maps on the intermediate scales 1/N1, 1/N2, . . . and the proper scale 1/Nb in the reducing or magnifying order at prescribed time intervals. Specifically, the scale successively-changing block 14 feeds the second map data to the display device 6 and controls the display device 6 to successively indicate the maps on the intermediate scales 1/N1, 1/N2, . . . and the proper scale 1/Nb in the reducing or magnifying order at the prescribed time intervals. Thus, the map indicated by the display device 6 is changed as follows. Firstly, the map on the current scale 1/Na is replaced by the map on the intermediate scale 1/N1. Secondly, the map on the intermediate scale 1/N1 is replaced by the map on the intermediate scale 1/N2. Such replacement is iterated until the map on the proper scale 1/Nb appears.

The guide point deciding block 11, the proper scale calculating block 12, the intermediate scale setting block 13, and the scale successively-changing block 14 will be further described.

The guide point deciding block 11 accesses the database 5 to read out the map data therefrom. The guide point deciding block 11 gets coordinates data concerning the map currently indicated by the display device 6, the coordinates of the next guide point "B", the coordinates of the large-area indication deciding frame F1, and the coordinates of the detailed indication deciding frame F2 on the basis of the read-out map data. As previously mentioned, the guide point deciding block 11 carries out the following determinations. Immediately after the vehicle passes one guide point, the guide point deciding block 11 determines whether the on-map position of the next guide point "B" is inside or outside the large-area indication deciding frame F1, and also determines whether the on-map position of the next guide point "B" is inside or outside the detailed indication deciding frame F2. The guide point deciding block 11 notifies the results of the determinations to the proper scale calculating block 12.

The proper scale calculating block 12 responds to the determination results notified by the guide point deciding block 11.

The proper scale calculating block 12 refers to the map data. The proper scale calculating block 12 computes the greatest map scale in a range where the next guide point "B" is located between the large-area indication deciding frame F1 and the detailed indication deciding frame F2, and where the distance between the current vehicle's position "A" and the next guide point "B" corresponds to from a half to about four-fifths of the diagonal of the screen of the display device 6. The proper scale calculating block 12 sets the computed scale as a proper scale 1/Nb. Accordingly, the proper scale 1/Nb is equal to or corresponds to the greatest one in a range where both the current vehicle's position "A" and the next guide point "B" are simultaneously in the screen of the display device 6 while being sufficiently remote from each other, and the recommended route is clearly shown.

As previously mentioned, the intermediate scale setting block 13 detects the scale 1/Na of the map currently indicated by the display device 6. The intermediate scale setting block 13 is informed of the proper scale 1/Nb computed by the proper scale calculating block 12. The intermediate scale setting block 13 sets a prescribed number of different intermediate scales 1/N1, 1/N2, . . . between the current scale 1/Na and the computed proper scale 1/Nb. The prescribed number is equal to, for example, 5 or 10. Preferably, the prescribed number is in the range of 2 to 15. The intermediate scale setting block 13 notifies the scale successively-changing block 14 of the intermediate scales 1/N1, 1/N2, . . . in addition to the proper scale 1/Nb.

In the case where the map data in the database 5 represents a set of maps on various predetermined scales, the intermediate scales 1/N1, 1/N2, . . . and the proper scale 1/Nb may be selected from the various predetermined scales.

The scale successively-changing block 14 accesses the database 5 to read out the map data therefrom. The scale successively-changing block 14 processes the read-out map data into second map data in response to the intermediate scales 1/N1, 1/N2, . . . and the proper scale 1/Nb. The processing of the read-out map data into the second map data corresponds to map reduction or map magnification. The second map data represents maps on the intermediate scales 1/N1, 1/N2, and the proper scale 1/Nb. The scale successively-changing block 14 feeds the second map data to the display device 6 and controls the display device 6 to successively indicate the maps on the intermediate scales 1/N1, 1/N2, . . . and the proper scale 1/Nb in the reducing or magnifying order at prescribed time intervals. The prescribed time intervals correspond to a period at which one map is replaced by the next map on the screen of the display device 6. Preferably, the prescribed time intervals are in the range of 0.1 to 0.5 second. Thus, the map indicated by the display device 6 is changed as follows. Firstly, the map on the current scale 1/Na is replaced by the map on the intermediate scale 1/N1. Secondly, the map on the intermediate scale 1/N1 is replaced by the map on the intermediate scale 1/N2. Such replacement is iterated until the map on the proper scale 1/Nb appears. Accordingly, the scale of the indicated map is changed on a zooming basis. The zooming time, that is, the time taken to replace the map on the current scale 1/Na with the map on the proper scale 1/Nb, depends on the prescribed number of the intermediate scales 1/N1, 1/N2, . . . . Preferably, the zooming time is in the range of 1 to 2 seconds. As the prescribed number of the intermediate scales 1/N1, 1/N2, . . . increases, a better zooming action with smoother animation effects and higher visual performances is implemented regarding map scale change.

In the case where the map data in the database 5 represents a set of maps on various predetermined scales, the map data read out from the database 5 may be directly used as the second map data.

Figure 4:
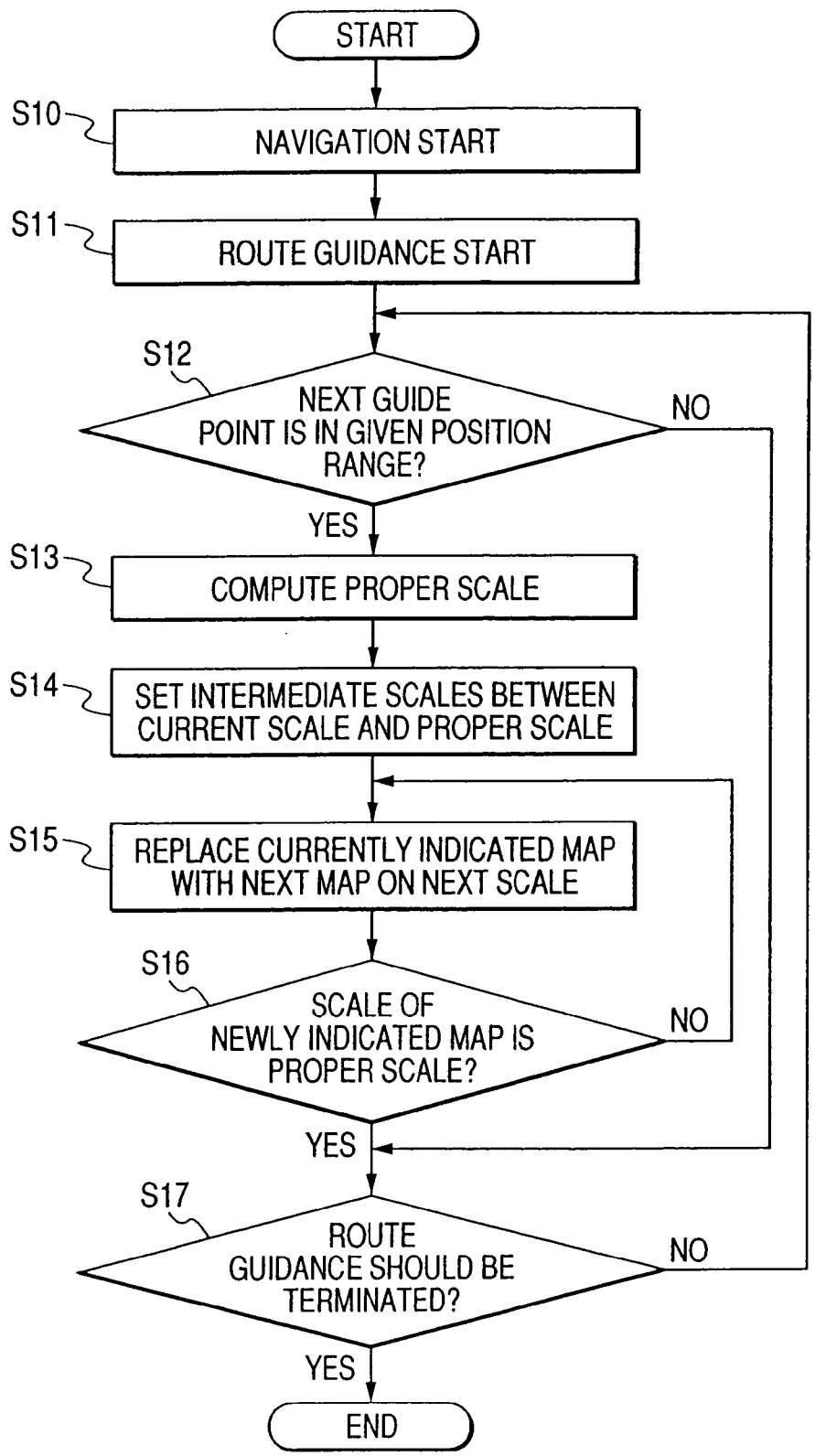
FIG. 4 is a flowchart of a segment of a control program for the processing unit in FIG. 1.

As previously mentioned, the processing unit 4 operates in accordance with a control program (a computer program) stored in its internal ROM. FIG. 4 is a flowchart of a segment of the control program. The program segment in FIG. 4 is executed each time the vehicle passes one guide point in the recommended route and a next guide point becomes of interest.

As shown in FIG. 4, a first step S10 in the program segment starts navigation as to the recommended route and a next guide point. Specifically, the step S10 receives information about a desired destination "X" which is inputted by the user through the operation unit 8. The step S10 derives the current vehicle's position "A" from the output signals of the GPS receiver 1, the azimuth sensor 2, and the vehicle speed sensor 3.

A step S11 following the step S10 gets information about the recommended route to the destination "X". The recommended route has been decided by searching the map data in the database 5. The step S11 gets information about the next guide point "B". The next guide point "B" has been detected by searching the map data in the database 5. The step S11 transfers the map data from the database 5 to the display device 6, and controls the display device 6 to indicate a map represented by the map data. Furthermore, the step S11 controls the display device 6 in response to the current vehicle's position "A" and the recommended route so that the current vehicle's position "A" and the recommended route will be shown in the indicated map. Thus, visual guidance as to the recommended route is started. In addition, the step S11 controls the voice guide unit 7 to start voice guidance as to the recommended route and the next guide point "B". After the step S11, the program advances to a step S12.

The step S12 gets information about the large-area indication deciding frame F1 and the detailed indication deciding frame F2. The step S12 determines whether the on-map position of the next guide point "B" is inside or outside the large-area indication deciding frame F1, and also determines whether the on-map position of the next guide point "B" is inside or outside the detailed indication deciding frame F2. When the on-map position of the next guide point "B" is outside the large-area indication deciding frame F1 or when the on-map position of the next guide point "B" is inside the detailed indication deciding frame F2, the program advances from the step S12 to a step S13. Otherwise, the program advances from the step S12 to a step S17.

The step S13 computes the proper scale 1/Nb of the indicated map while referring to the map data in the database 5. The proper scale 1/Nb is equal to or corresponds to the greatest one in a range where both the current vehicle's position "A" and the next guide point "B" are simultaneously in the screen of the display device 6.

A step S14 following the step S13 gets information about the scale 1/Na of the map currently indicated by the display device 6. The step S14 sets a prescribed number of different intermediate scales 1/N1, 1/N2, . . . between the current scale 1/Na and the proper scale 1/Nb. Preferably, the prescribed number is in the range of 2 to 15. After the step S14, the program advances to a step S15.

The step S15 reads out the map data from the database 5. The step S15 processes the read-out map data into second map data in response to one of the intermediate scales 1/N1, 1/N2, . . . and the proper scale 1/Nb which is next to the scale of the currently indicated map. The processing of the read-out map data into the second map data corresponds to a partial stage of map reduction or map magnification. The second map data represents a next map on the next scale. The step S15 feeds the second map data to the display device 6 and controls the display device 6 to replace the currently indicated map with the next map on the next scale.

A step S16 decides whether or not the newly indicated map is the same as one on the proper scale 1/Nb. When the newly indicated map is the same as one on the proper scale 1/Nb, the program advances from the step S16 to the step S17. Otherwise, the program returns from the step S16 to the step S15.

As a result of the iteration of the steps S15 and S16, the indicated map on the current scale 1/Na is replaced by the map on the intermediate scale 1/N1, and the maps on the intermediate scales 1/N1, 1/N2, . . . and the proper scale 1/Nb are successively indicated by the display device 6 in the reducing or magnifying order at the prescribed time intervals. Then, the map on the proper scale 1/Nb continues to be indicated until next map change is required.

The step S17 decides whether or not the visual and voice guidance as to the recommended route and the next guide point "B" should be terminated. When the visual and voice guidance as to the recommended route and the next guide point "B" should be terminated, the program exits from the step S17 and then the current execution cycle of the program segment ends. Otherwise, the program returns from the step S17 to the step S12.

As previously mentioned, the program segment in FIG. 4 is executed each time the vehicle passes one guide point in the recommended route and a next guide point becomes of interest. Finally, the vehicle approaches the destination "X", and the program segment in FIG. 4 causes the display device 6 to indicate a detailed small-area map showing the destination "X".

As the vehicle moves toward the next guide point "B", the current vehicle's position "A" and the next guide point "B" move toward each other. When the vehicle approaches the next guide point "B" so that the on-map position of the next guide point "B" enters the detailed indication deciding frame F2, a large-area map indicated by the display device 6 is replaced by a detailed small-area map. During the indicated map replacement, the large-area map on a current scale 1/Na, intermediate-area maps on intermediate scales 1/N1, 1/N2, . . . , and the detailed small-area map on a proper scale 1/Nb are successively indicated by the display device 6.

After the vehicle passes the guide point "B", a next guide point "C" becomes of interest. In the case where the on-map position of the next guide point "C" is outside the large-area indication deciding frame F1, a detailed small-area map indicated by the display device 6 is replaced by a large-area map immediately after the vehicle passes the guide point "B". During the indicated map replacement, the detailed small-area map on a current scale 1/Nb, intermediate-area maps on intermediate scales 1/N1, 1/N2, . . . , and the large-area map on a new proper scale 1/Nc are successively indicated by the display device 6.

Preferably, the indicated map, the current vehicle's position "A" in the indicated map, and the next guide point "B" in the indicated map are designed as follows. The current vehicle's position "A" is fixed with respect to the screen of the display device 6. As the vehicle travels, the indicated map moves relative to the current vehicle's position "A" while the next guide point "B" moves toward the current vehicle's position "A".

Alternatively, the indicated map and the current vehicle's position "A" in the indicated map may be designed as follows. The indicated map is fixed with respect to the screen of the display device 6 while the current vehicle's position "A" moves relative to the indicated map in accordance with travel of the vehicle. A large-area map indicated by the display device 6 may be replaced by a detailed small-area map in response to whether or not both the on-map positions of the current vehicle's position "A" and the next guide point "B" are in the detailed indication deciding frame F2. During the indicated map replacement, the large-area map on the current scale 1/Na, the intermediate-area maps on the intermediate scales 1/N1, 1/N2, ..., and the detailed small-area map on the proper scale 1/Nb are successively indicated by the display device 6.

Figure 5:
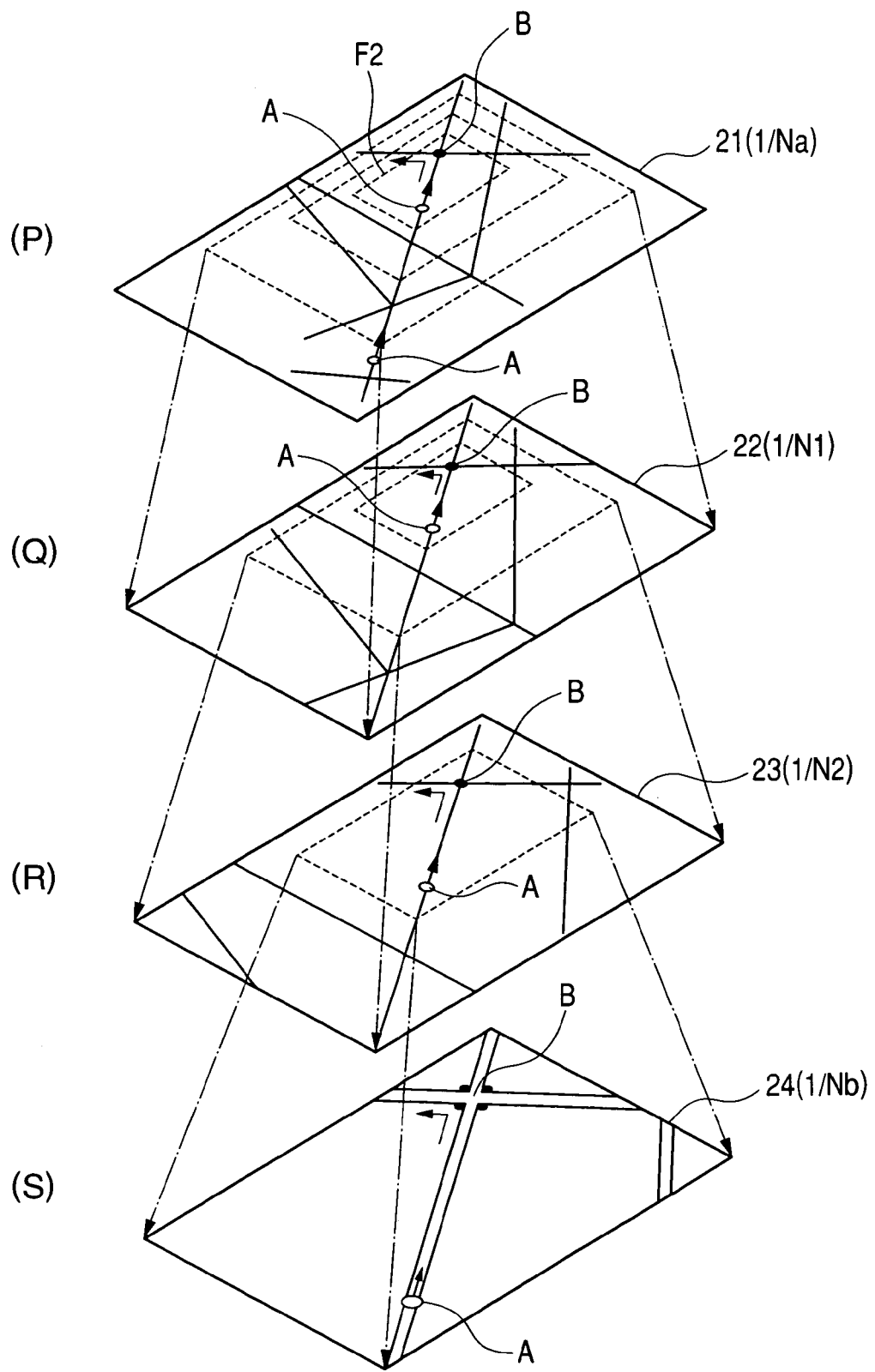
FIG. 5 is a diagram of an example of maps successively indicated by the display device in FIG. 1.

FIG. 5 shows an example of maps successively indicated by the display device 6. Firstly, a large-area map 21 on a current scale 1/Na is indicated by the display device 6 (see the portion (P) of FIG. 5). The large-area map 21 contains both the current vehicle's position "A" and the next guide point "B". At this time, the current vehicle's position "A" and the next guide point "B" are distant from each other. The next guide point "B" is in the detailed indication deciding frame F2. The next guide point "B" is a crossing at which the vehicle should turn to the left. The large-area map 21 shows a straight portion of a recommended route which extends between the current vehicle's position "A" and the next guide point "B".

As the vehicle travels along the straight portion of the recommended route and approaches the next guide point "B", the current vehicle's position "A" in the indicated map enters the detailed indication deciding frame F2. When the current vehicle's position "A" enters the detailed indication deciding frame F2, the large-area map 21 on the current scale 1/Na is replaced by a detailed small-area map 24 on a computed proper scale 1/Nb (see the portion (S) of FIG. 5). The detailed small-area map 24 corresponds to the expansion of the portion of the large-area map 21 in the detailed indication deciding frame F2 to the size equal to the screen of the display device 6. During the indicated map replacement, the large-area map 21 on the current scale 1/Na, intermediate-area maps 22 and 23 on intermediate scales 1/N1 and 1/N2, and the detailed small-area map 24 on the proper scale 1/Nb are successively indicated by the display device 6 (see the portions (P), (Q), (R), and (S) of FIG. 5) at prescribed time intervals in the range of 0.1 to 0.5 second. Accordingly, the indicated map change is on a zooming-in basis, and has animation effects.

When the vehicle approaches the next guide point "B", the visual and voice guidance as to the next guide point "B" is given. The vehicle's driver follows the guidance, and turns the vehicle to the left at the guide point (the crossing) "B".

Figure 6:
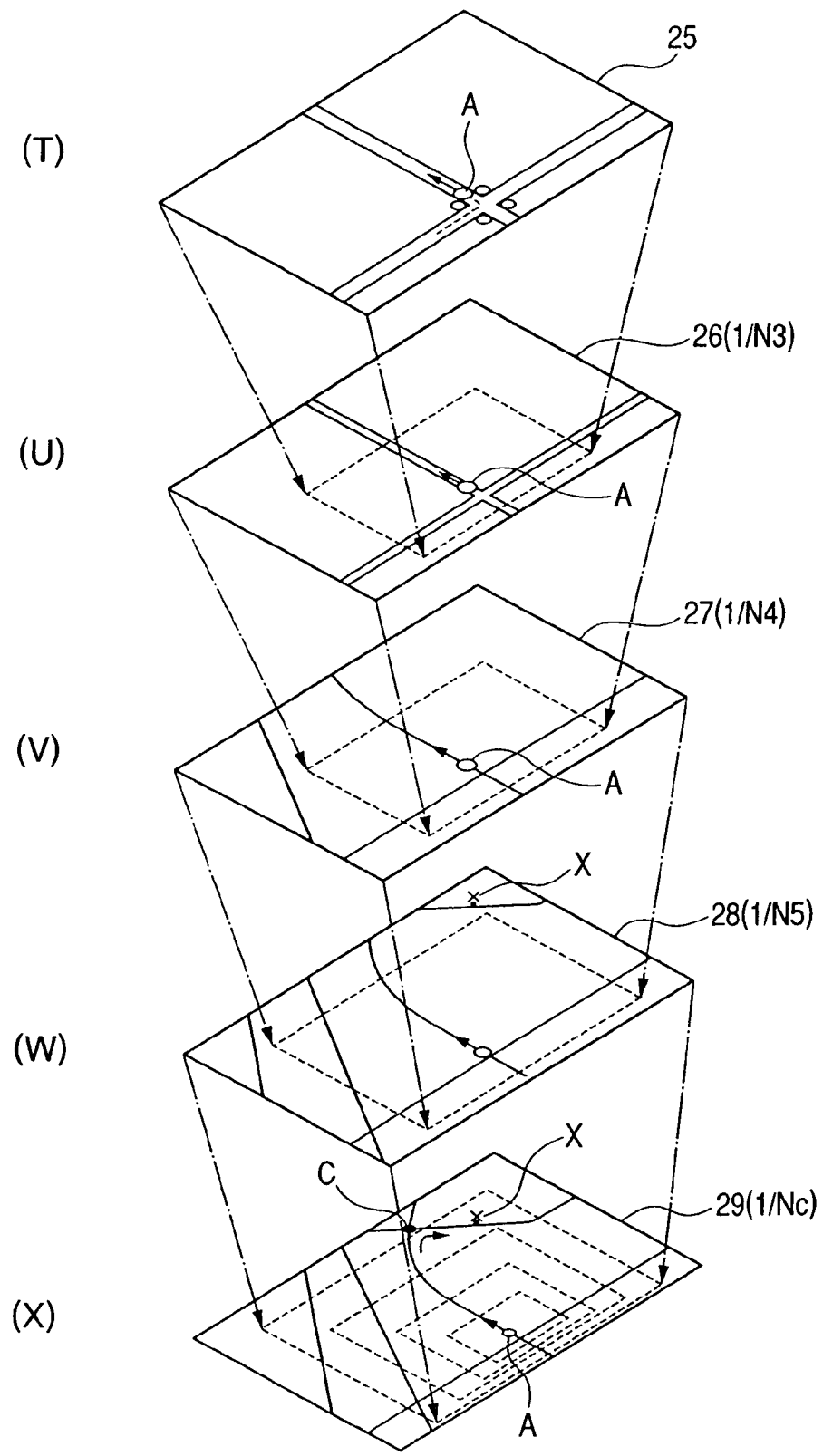
FIG. 6 is a diagram of another example of maps successively indicated by the display device in FIG. 1.

FIG. 6 shows another example of maps successively indicated by the display device 6. When the vehicle turns to the left at the guide point "B", a detailed small-area map 25 on the proper scale 1/Nb is indicated by the display device 6 (see the portion (T) of FIG. 6). Since the on-map position of a next guide point "C" is outside the large-area indication deciding frame F1 in the detailed small-area map 25, the detailed small-area map 25 is replaced by a large-area map 29 on a next computed proper scale 1/Nc which contains both the current vehicle's position "A" and the next guide point "C" (see the portion (X) of FIG. 6). The indicated map replacement is carried out by the steps S12-S16 in FIG. 4. During the indicated map replacement, the detailed small-area map 25 on the current scale 1/Nb, intermediate-area maps 26, 27, and 28 on intermediate scales 1/N3, 1/N4, and 1/N5, and the large-area map 29 on the proper scale 1/Nc are successively indicated by the display device 6 (see the portions (T), (U), (V), (W), and (X) of FIG. 6) at prescribed time intervals in the range of 0.1 to 0.5 second. Accordingly, the indicated map change is on a zooming-out basis, and has animation effects.

The navigation apparatus 20 provides advantages as follows. Each time the vehicle passes a guide point in a recommended route to a desired destination, a detailed small-area map indicated by the display device 6 is replaced by a large-area map containing both the current vehicle's position "A" and a next guide point "B". When the vehicle approaches the next guide point "B", the large-area map is replaced by a detailed small-area map. Therefore, the user (the vehicle's driver) can easily and surely recognize the recommended route. The indicated map change is on a zooming basis, and has good animation effects and high visual performances.

Second Embodiment

Figure 7:
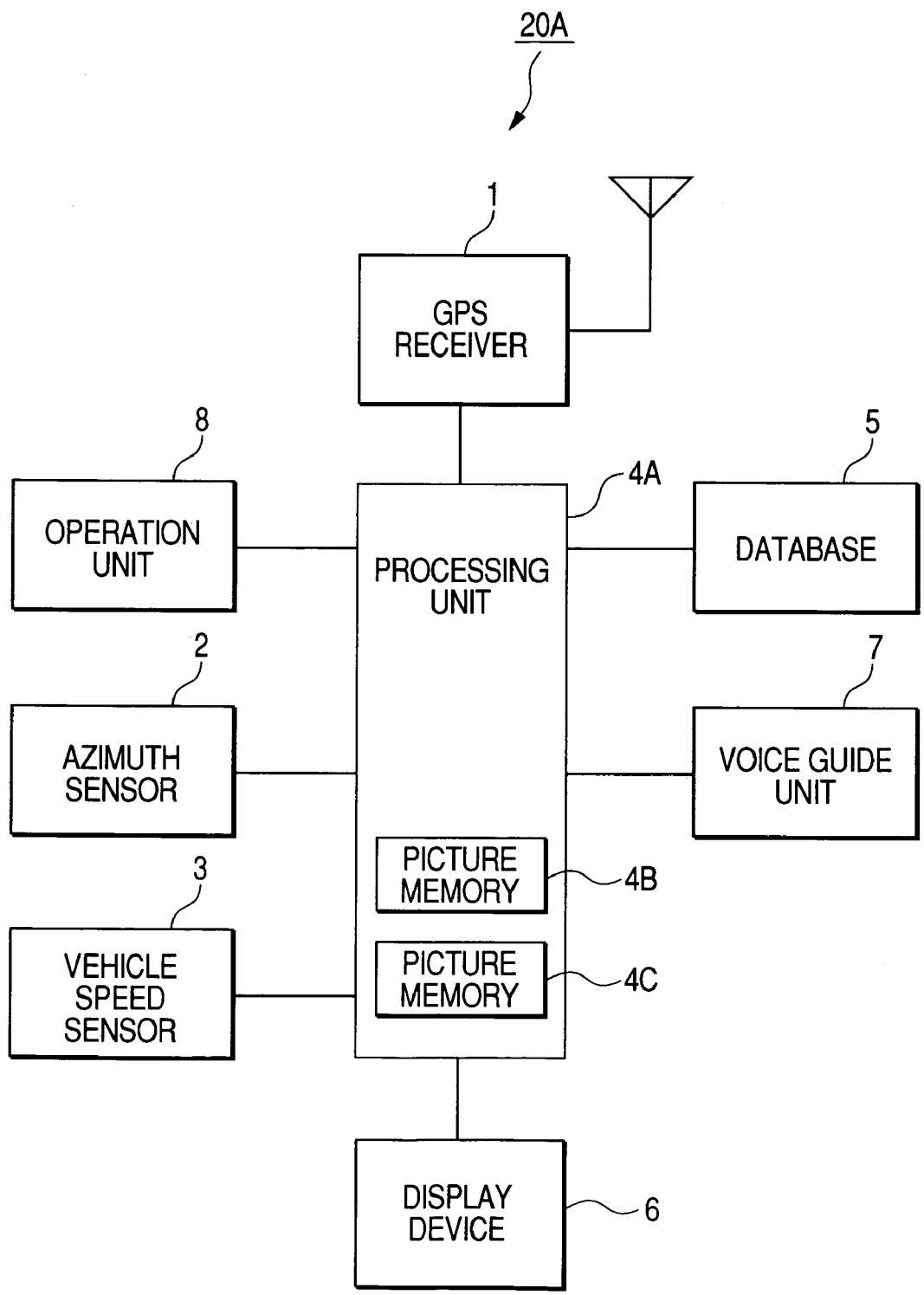
FIG. 7 is a block diagram of a navigation apparatus according to a second embodiment of this invention.

FIG. 7 shows a navigation apparatus 20A according to a second embodiment of this invention. The navigation apparatus 20A is similar to the navigation apparatus 20 (see FIG. 1) except for design changes mentioned hereafter. As shown in FIG. 7, the navigation apparatus 20A includes a processing unit 4A instead of the processing unit 4 (see FIG. 1). The processing unit 4A has a RAM in which two picture memories 4B and 4C are provided.

Figure 8:
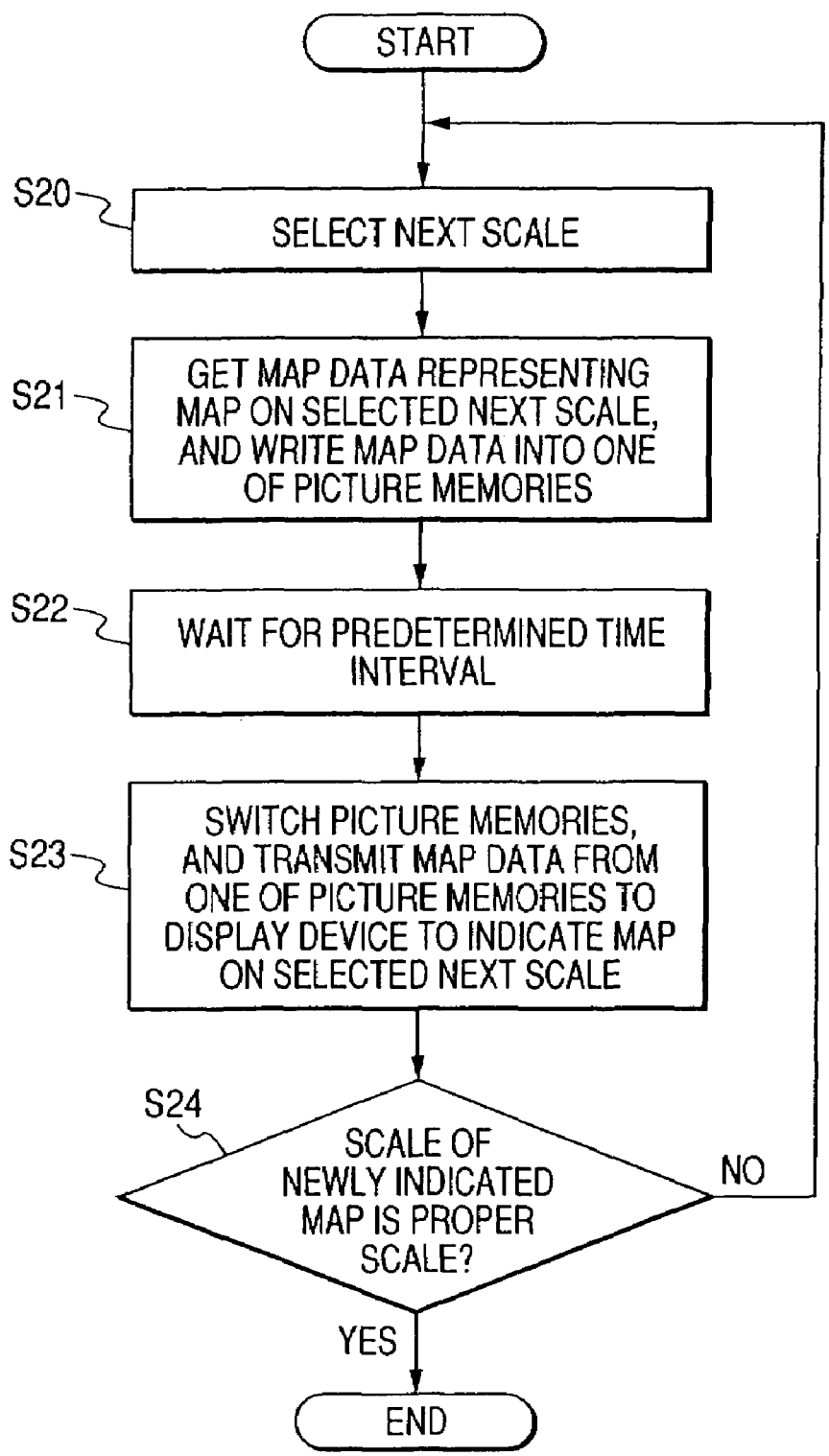
FIG. 8 is a flowchart of a segment of a control program for a processing unit in FIG. 7.

FIG. 8 is a flowchart of a segment of a control program for the processing unit 4A which relates to indicated map replacement. As shown in FIG. 8, a first step S20 of the program segment selects next one among intermediate scales 1/N1, 1/N2, ..., and a proper scale 1/Nb.

A step S21 following the step S20 reads out the map data from the database 5. The step S21 processes the read-out map data into second map data in response to the next scale selected by the step S20. The processing of the read-out map data into the second map data corresponds to a partial stage of map reduction or map magnification. The second map data represents a map on the next scale. The step S21 selects one from the picture memories 4B and 4C which is disconnected from the display device 6 as a first picture memory. The step S21 writes the second map into the first picture memory. In other words, the step S21 uses the first picture memory for a map drawing purpose. The other of the picture memories 4B and 4C is defined as a second picture memory. The second picture memory is connected with the display device 6. Thus, map data is transmitted from the second picture memory to the display device 6 so that a map represented by the transmitted map data is visualized by the display device 6.

A step S22 subsequent to the step S21 waits for a predetermined time interval. Preferably, the predetermined time interval is 500 milliseconds or shorter.

A step S23 following the step S22 connects the first picture memory with the display device 6, and disconnects the second picture memory therefrom. The step S23 transmits the map data from the first picture memory to the display device 6, and controls the display device 6 to indicate the map represented by the transmitted map data. Thus, the indicated map is replaced by new one. The newly indicated map is on the scale selected by the step S20.

A step S24 subsequent to the step S23 decides whether or not the scale of the newly indicated map is equal to the proper scale 1/Nb. When the scale of the newly indicated map is equal to the proper scale 1/Nb, the program exits from the step S24 and then the current execution cycle of the program segment ends. Otherwise, the program returns from the step S24 to the step S20.

As a result of the execution of the program segment in FIG. 8, the map on the current scale 1/Na which is indicated by the display device 6 is replaced by the map on the intermediate scale 1/N1, and the maps on the intermediate scales 1/N1, 1/N2, ..., and the proper scale 1/Nb are successively indicated by the display device 6.

During a first period, first one of the picture memories 4B and 4C is used for a map drawing purpose while the second picture memory is used for indicating a map on the display device 6. During a second period following the first period, the second picture memory is used for a map drawing purpose while the first picture memory is used for indicating a map on the display device 6. Such periods are iterated until the map on the proper scale 1/Nb is indicated by the display device 6.

What is claimed is:

1. A navigation apparatus for a vehicle, comprising:
a position detector for detecting a current position of the vehicle;
first means for deciding a recommended route from the current position of the vehicle to a desired destination;
a display device having a screen having a first size;
second means for controlling the display device to indicate a map on a first scale, at least a portion of the recommended route, and the current position of the vehicle on the screen;
third means for, after the vehicle passes a first guide point in the recommended route, determining whether or not an on-map position of a second guide point in the recommended route which is next to the first guide point is outside a predetermined large-area indication deciding frame in the screen, and determining whether or not the on-map position of the second guide point is inside a predetermined detailed indication deciding frame in the screen, wherein the predetermined large-area indication deciding frame has a second size smaller than the first size, and the predetermined detailed indication deciding frame has a third size smaller than the second size;
fourth means for computing a second scale in a range of scales, where the current position of the vehicle and the on-map position of the second guide point are in the screen when the third means determines that the on-map position of the second guide point is outside the predetermined large-area indication deciding frame or inside the predetermined detailed indication deciding frame;
fifth means for setting a prescribed number of different intermediate scales between the first scale and the second scale; and
sixth means for controlling the display device to successively indicate the map on the first scale, maps on the different intermediate scales, and a map on the second scale on the screen in either a reducing order or a magnifying order at prescribed time intervals;
wherein the sixth means comprises a first picture memory, a second picture memory, means for writing data representative of the map on the first scale, the maps on the different intermediate scales, and the map on the second scale alternately into the first picture memory and the second picture memory, and means for transmitting the data alternately from the first picture memory, and the second picture memory to the display device.

2. A method of vehicle navigation, comprising the steps of:
detecting a current position of a vehicle;
deciding a recommended route from the current position of the vehicle to a desired destination;
indicating a map on a first scale, at least a portion of the recommended route, and the current position of the vehicle on a screen having a first size;
after the vehicle passes a first guide point in the recommended route, determining whether or not an on-map position of a second guide point in the recommended route which is next to the first guide point is outside a predetermined large-area indication deciding frame in the screen, and determining whether or not the on-map position of the second guide point is inside a predetermined detailed indication deciding frame in the screen, wherein the predetermined large-area indication deciding frame has a second size smaller than the first size, and the predetermined detailed indication deciding frame has a third size smaller than the second size;
computing a second scale in a range of scales, where the current position of the vehicle and the on-map position of the second guide point are in the screen when it is determined that the on-map position of the second guide point is outside the predetermined large-area indication deciding frame or inside the predetermined detailed indication deciding frame;
setting a prescribed number of different intermediate scales between the first scale and the second scale; and
successively indicating the map on the first scale, maps on the different intermediate scales, and a map on the second scale on the screen in either a reducing order or a magnifying order at prescribed time intervals;
wherein the successively indicating step comprises writing data representative of the map on the first scale, the maps on the different intermediate scales, and the map on the second scale alternately into a first picture memory and a second picture memory, and transmitting the data alternately from the first picture memory and the second picture memory to a display device having the screen.

3. A map-indication control program for use in a vehicle navigation apparatus including a position detector for detecting a current position of a vehicle, means for deciding a recommended route from the current position of the vehicle to a desired destination, a display device having a screen having a first size, and means for controlling the display device to indicate a map on a first scale, at least a portion of the recommended route, and the current position of the vehicle on the screen, the map-indication control program enabling a computer in the vehicle navigation apparatus to operate as:
first means for, after the vehicle passes a first guide point in the recommended route, determining whether or not an on-map position of a second guide point in the recommended route which is next to the first guide point is outside a predetermined large-area indication deciding frame in the screen, and determining whether or not the on-map position of the second guide point is inside a predetermined detailed indication deciding frame in the screen, wherein the predetermined large-area indication deciding frame has a second size smaller than the first size, and the predetermined detailed indication deciding frame has a third size smaller than the second size;
second means for computing a second scale in a range of scales, where the current position of the vehicle and the on-map position of the second guide point are in the screen when the first means determines that the on-map position of the second guide point is outside the predetermined large-area indication deciding frame or inside the predetermined detailed indication deciding frame;
third means for setting a prescribed number of different intermediate scales between the first scale and the second scale; and
fourth means for controlling the display device to successively indicate the map on the first scale, maps on the different intermediate scales, and a map on the second scale on the screen in either a reducing order or a magnifying order at prescribed time intervals;

wherein the fourth means comprises a first picture memory, a second picture memory, means for writing data representative of the map on the first scale, the maps on the different intermediate scales, and the map on the second scale alternately into the first picture memory and the second picture memory, and means for transmitting the data alternately from the first picture memory and the second picture memory to the display device.

4. A navigation apparatus for a vehicle, comprising:

a position detector for detecting a current position of the vehicle;

first means for deciding a recommended route from the current position of the vehicle to a desired destination;

a display device having a screen having a first size;

second means for controlling the display device to indicate a map on a first scale, at least a portion of the recommended route, and the current position of the vehicle on the screen;

third means for, after the vehicle passes a first guide point in the recommended route, determining whether or not an on-map position of a second guide point in the recommended route which is next to the first guide point is outside a predetermined rectangular large-area indication deciding frame in the screen, and determining whether or not the on-map position of the second guide point is inside a predetermined rectangular detailed indication deciding frame in the screen, wherein the predetermined rectangular large-area indication deciding frame has a second size smaller than the first size, and the predetermined rectangular detailed indication deciding frame has a third size smaller than the second size;

fourth means for computing a second scale in a range of scales, where the current position of the vehicle and the on-map position of the second guide point are in the screen when the third means determines that the on-map position of the second guide point is outside the predetermined rectangular large-area indication deciding frame or inside the predetermined rectangular detailed indication deciding frame;

fifth means for setting a prescribed number of different intermediate scales between the first scale and the second scale; and sixth means for controlling the display device to successively indicate the map on the first scale, maps on the different intermediate scales, and a map on the second scale on the screen in either a reducing order or a magnifying order at prescribed time intervals wherein the sixth means comprises a first picture memory, a second picture memory, means for writing data representative of the map on the first scale, the maps on the different intermediate scales, and the map on the second scale alternately into the first picture memory and the second picture memory, and means for transmitting the data alternately from the first picture memory and the second picture memory to the display device.

5. A navigation apparatus as recited in claim 4, wherein the current position of the vehicle which is indicated on the screen is on respective one sides of the predetermined rectangular large-area indication deciding frame and the predetermined rectangular detailed indication deciding frame.

* * * * *